(12) United States Patent
Zhou et al.

(10) Patent No.: US 9,043,552 B2
(45) Date of Patent: May 26, 2015

(54) SYSTEMS AND METHODS FOR OPERATING A FLASH MEMORY FILE SYSTEM

(71) Applicant: Marvell World Trade Ltd., St. Michael (BB)

(72) Inventors: Wei Zhou, San Jose, CA (US); Chee Hoe Chu, San Jose, CA (US); Po-Chien Chang, Saratoga, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/532,108

(22) Filed: Nov. 4, 2014

(65) Prior Publication Data

US 2015/0058383 A1    Feb. 26, 2015

Related U.S. Application Data

(63) Continuation of application No. 12/940,377, filed on Nov. 5, 2010, now Pat. No. 8,886,885.

(60) Provisional application No. 61/261,124, filed on Nov. 13, 2009.

(51) Int. Cl.
*G06F 12/00*     (2006.01)
*G06F 17/30*    (2006.01)
*G06F 12/02*    (2006.01)
*G06F 12/08*    (2006.01)

(52) U.S. Cl.
CPC ...... *G06F 17/30218* (2013.01); *G06F 12/0246* (2013.01); *G06F 12/0813* (2013.01); *G06F 12/0866* (2013.01)

(58) Field of Classification Search
CPC ............ G06F 12/0246; G06F 12/0813; G06F 12/0866
See application file for complete search history.

(56) References Cited

U.S. PATENT DOCUMENTS

| 5,680,579 A | 10/1997 | Young et al. |
| 6,366,977 B1 | 4/2002 | Mizoguchi |
| 2004/0024962 A1 | 2/2004 | Chatterjee et al. |
| 2005/0138284 A1 | 6/2005 | Cohn et al. |
| 2008/0215800 A1 | 9/2008 | Lee et al. |
| 2009/0204872 A1 | 8/2009 | Yu et al. |
| 2010/0125695 A1 | 5/2010 | Wu et al. |

OTHER PUBLICATIONS

Notification of Transmittal of The Partial International Search Report and Restriction Requirement dated Mar. 16, 2011 for application PCT/US2010/056519, 7 pages.

*Primary Examiner* — Larry Mackall

(57) ABSTRACT

A flash memory file system including a plurality of flash modules. Each of the plurality of flash modules includes a respective cache memory, a respective flash memory, and a respective flash controller in communication with the respective cache memory and the respective flash memory. A first flash module of the plurality of flash modules is configured to receive a file lookup message including a path name for file data stored on a second flash module of the plurality of flash modules. A third flash module of the plurality of flash modules is configured to select the second flash module based on the path name and a directory table, and generate a file metadata message responsive to the file lookup message. The file metadata message identifies the second flash module as containing the file data.

18 Claims, 5 Drawing Sheets

SYSTEMS AND METHODS FOR OPERATING A FLASH MEMORY FILE SYSTEM

CROSS-REFERENCE TO RELATED APPLICATIONS

The present disclosure is a continuation of U.S. patent application Ser. No. 12/940,377 (now U.S. Pat. No. 8,886,885), filed on Nov. 5, 2010, which claims the benefit of U.S. Provisional Application No. 61/261,124, filed on Nov. 13, 2009. The entire disclosures of the applications referenced above are incorporated herein by reference.

FIELD

The present disclosure relates generally to file systems for data storage. More particularly, the present disclosure relates to a flash memory file system.

BACKGROUND

Flash memory is a type of memory that is non-volatile, can be electrically erased and written, and that offers short read access times. For these reasons, flash memory has become increasingly popular in portable devices such as personal digital assistants, mobile phones, digital music players, and the like, as well as in computer systems in the form of solid-state drives.

SUMMARY

In general, in one aspect, an embodiment features an apparatus comprising: a plurality of flash modules, wherein each of the flash modules comprises a cache memory; a flash memory; and a flash controller in communication with the cache memory and the flash memory; wherein the flash controller of a first one of the flash modules is configured to operate the cache memories together as a global cache; wherein the flash controller of a second one of the flash modules is configured to operate a second one of the flash modules as a directory controller for the flash memories.

Embodiments of the apparatus can include one or more of the following features. In some embodiments, at least one flash controller operates a first portion of the respective cache memory as a local cache, and operates a second portion of each cache memory as a part of the global cache. Some embodiments comprise a plurality of flash controller cards, wherein each of the flash controller cards comprises one of the flash modules.

In general, in one aspect, an embodiment features non-transitory computer-readable media embodying instructions executable by one or more flash controllers to perform a method comprising: receiving a file lookup message at a first one of a plurality of flash modules, wherein each of the flash modules includes a flash memory and one of the flash controllers, and wherein the file lookup message includes a path name for file data; selecting a second one of the flash modules based on the path name and a directory table; and sending a file metadata message, responsive to the file lookup message, wherein the file metadata message identifies the second one of the flash modules as containing the file data.

Embodiments of the non-transitory computer-readable media can include one or more of the following features. In some embodiments, selecting the second one of the flash modules comprises: determining a block logical number based on the path name; sending a lookup message from the first one of the flash modules to a third one of the flash modules, wherein the lookup message includes the block logical number; and selecting, at the third one of the flash modules, the second one of the flash controllers based on the block logical number. In some embodiments, the method further comprises: receiving a read message at the second one of the flash modules, subsequent to sending the file metadata message, wherein the read message includes the block logical number; and sending a file data message, from the second one of the flash modules, responsive to the read message, wherein the file data message contains the file data corresponding to the block logical number. In some embodiments, each of the flash modules comprises a respective cache memory, and the method further comprises: determining whether the cache memory of the second one of the flash modules contains data corresponding to the block logical number; and moving data from the flash memory of the second one of the flash modules to the cache memory of the second one of the flash modules responsive to the cache memory of the second one of the flash modules not containing data corresponding to the block logical number. In some embodiments, the method further comprises: receiving a write message at the second one of the flash modules, wherein the write message includes the file data and the block logical number; and storing the file data in the memories of the second one of the flash modules according to the block logical number.

In general, in one aspect, an embodiment features a method comprising: receiving a file lookup message at a first one of a plurality of flash modules, wherein each of the flash modules includes a plurality of flash memories and a respective flash controller, and wherein the file lookup message includes a path name for file data; selecting a second one of the flash modules based on the path name and a directory table stored in the memories of the first one of the flash modules; and sending a file metadata message, responsive to the file lookup message, wherein the file metadata message identifies the second one of the flash modules as containing the file data. In some embodiments, selecting the second one of the flash modules comprises: determining a block logical number based on the path name; sending a lookup message from the first one of the flash modules to a third one of the flash modules, wherein the lookup message includes the block logical number; and selecting, at the third one of the flash modules, the second one of the flash controllers based on the block logical number. In some embodiments, the method further comprises: receiving a read message at the second one of the flash modules, subsequent to sending the file metadata message, wherein the read message includes the block logical number; and sending a file data message, from the second one of the flash modules, responsive to the read message, wherein the file data message contains the file data corresponding to the block logical number. Some embodiments comprise receiving a write message at the second one of the flash modules, wherein the write message includes the file data and the block logical number; and storing the file data in the memories of the second one of the flash modules according to the block logical number. In some embodiments, each of the flash modules comprises a respective cache memory, and the method further comprises: determining whether the cache memory of the second one of the flash modules contains a block of data corresponding to the block logical number; moving data from the cache memory of the second one of the flash modules to the flash memory of the second one of the flash modules, responsive to the cache memory of the second one of the flash modules not containing data corresponding to the block logical number; and storing the file data in the cache memory of the second one of the flash modules subsequent to moving the data.

The details of one or more implementations are set forth in the accompanying drawings and the description below. Other features will be apparent from the description and drawings, and from the claims.

Figure 1:
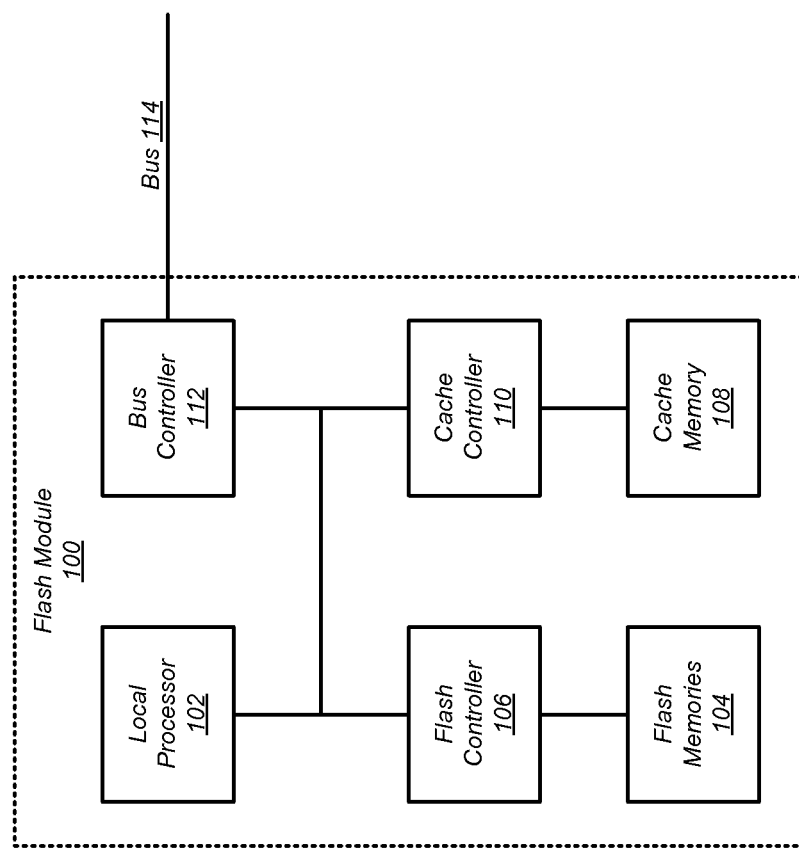
FIG. 1 shows elements of a flash module according to one embodiment.

The leading digit(s) of each reference numeral used in this specification indicates the number of the drawing in which the reference numeral first appears.

DESCRIPTION

Embodiments of the present disclosure provide elements of a flash memory file system. The system includes a plurality of flash modules. Each flash module includes a cache memory, a plurality of flash memories, and a flash controller. One of the flash modules is configured as a directory controller, which tracks the location of blocks of data in the flash memories. Another of the flash modules is configured as a cache controller, which operates a portion of each of the cache memories together as a global cache. Another portion of each cache memory is operated as a local cache, for example for buffering write operations to local flash memory. The remainder of the flash controllers are configured as data controllers for data storage. In some embodiments, one or more of the flash modules are configured to support two or more of these roles.

Each flash module can be implemented as a respective card for connection with a backplane. The backplane can be connected to a motherboard, for example with a bus and switch. A host processor on the motherboard can operate the flash controllers as a file system for data storage.

FIG. 1 shows elements of a flash module 100 according to one embodiment. Although in the described embodiments the elements of flash module 100 are presented in one arrangement, other embodiments may feature other arrangements. For example, elements of flash module 100 can be implemented in hardware, software, or combinations thereof. Referring to FIG. 1, flash module 100 includes a local processor 102, a plurality of flash memories 104 controlled by a flash controller 106, a cache memory 108 controlled by a cache memory controller 110, and a bus controller 112 for connection with a bus 114.

Figure 2:
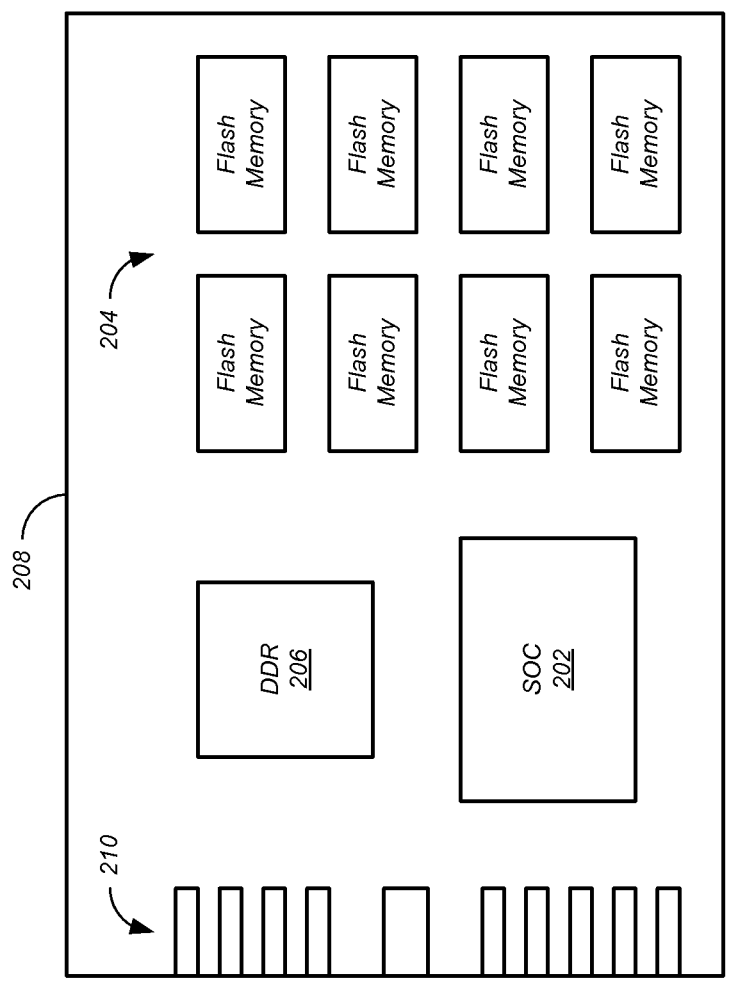
FIG. 2 shows an implementation of the flash module of FIG. 1 according to one embodiment.

FIG. 2 shows an implementation of flash module 100 of FIG. 1 according to one embodiment. Referring to FIG. 2, local processor 102, flash controller 106, cache memory controller 110, and bus controller 112 are implemented together as a system-on-chip (SOC) 202. Flash memories 104 are implemented as flash memory chips 204, and cache memory 108 is implemented as a double data rate (DDR) memory chip 206. DDR memory chip 206 can also be used for temporary storage of data and code for SOC 202. Chips 202, 204, and 206 are mounted on a card 208 that includes connectors 210 for connection with a backplane.

Figure 3:
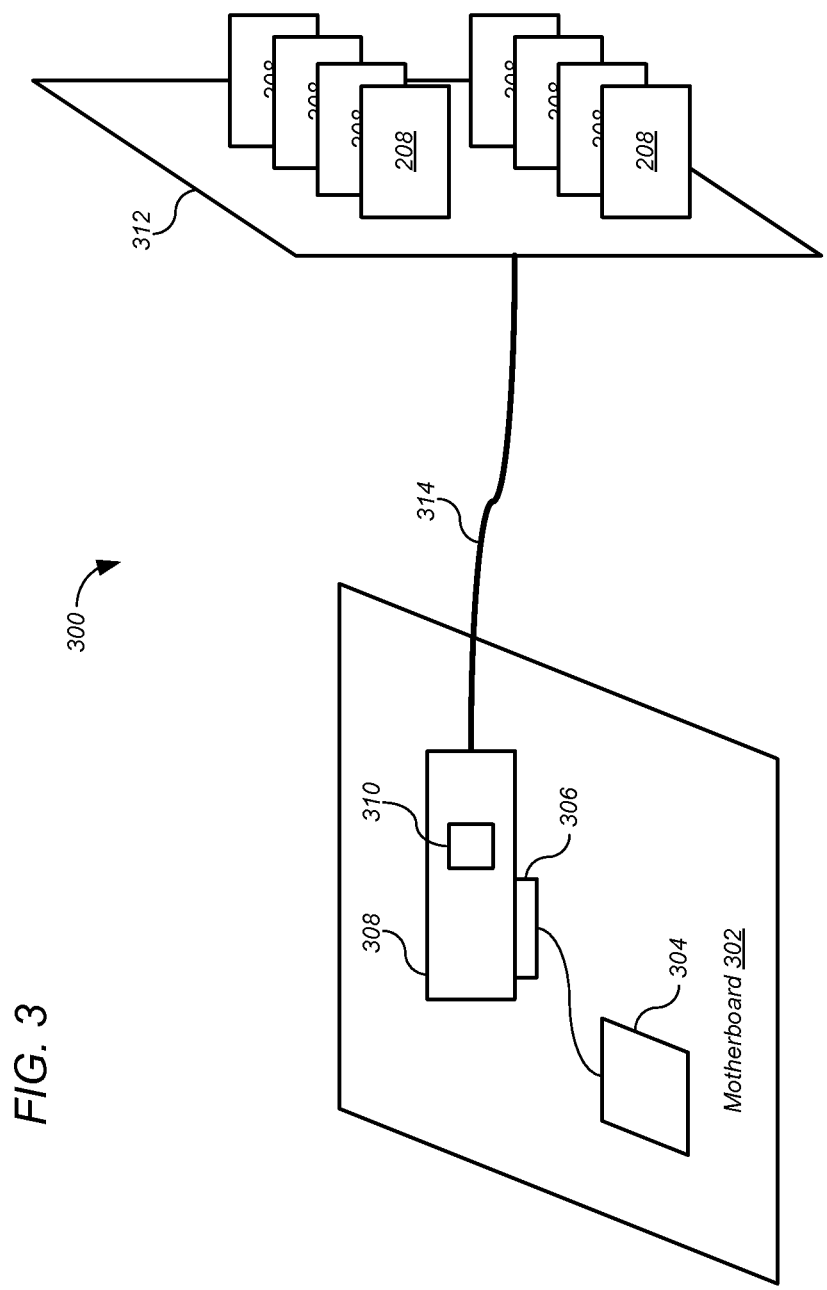
FIG. 3 shows an implementation of a flash memory file system that includes a plurality of flash modules according to one embodiment.

FIG. 3 shows an implementation 300 of a flash memory file system that includes a plurality of flash modules 100 according to one embodiment. In implementation 300, bus 314 is implemented as a Peripheral Component Interconnect Express (PCIE) bus. In other implementations, other types of busses are used instead. Referring to FIG. 3, implementation 300 includes a motherboard 302 that includes a host processor 304 and a PCIE slot 306. A PCIE card 308 having a PCIE switch chip 310 is inserted into PCIE slot 306. PCIE card 308 is connected to a backplane 312 by a PCIE cable 314. A plurality of cards 208 (FIG. 2) are inserted into slots in backplane 312. In one implementation, PCIE switch chip 310 has 32 ports, with 16 of the ports connected to motherboard 302 and the remaining 16 ports connected to backplane 312.

Figure 4:
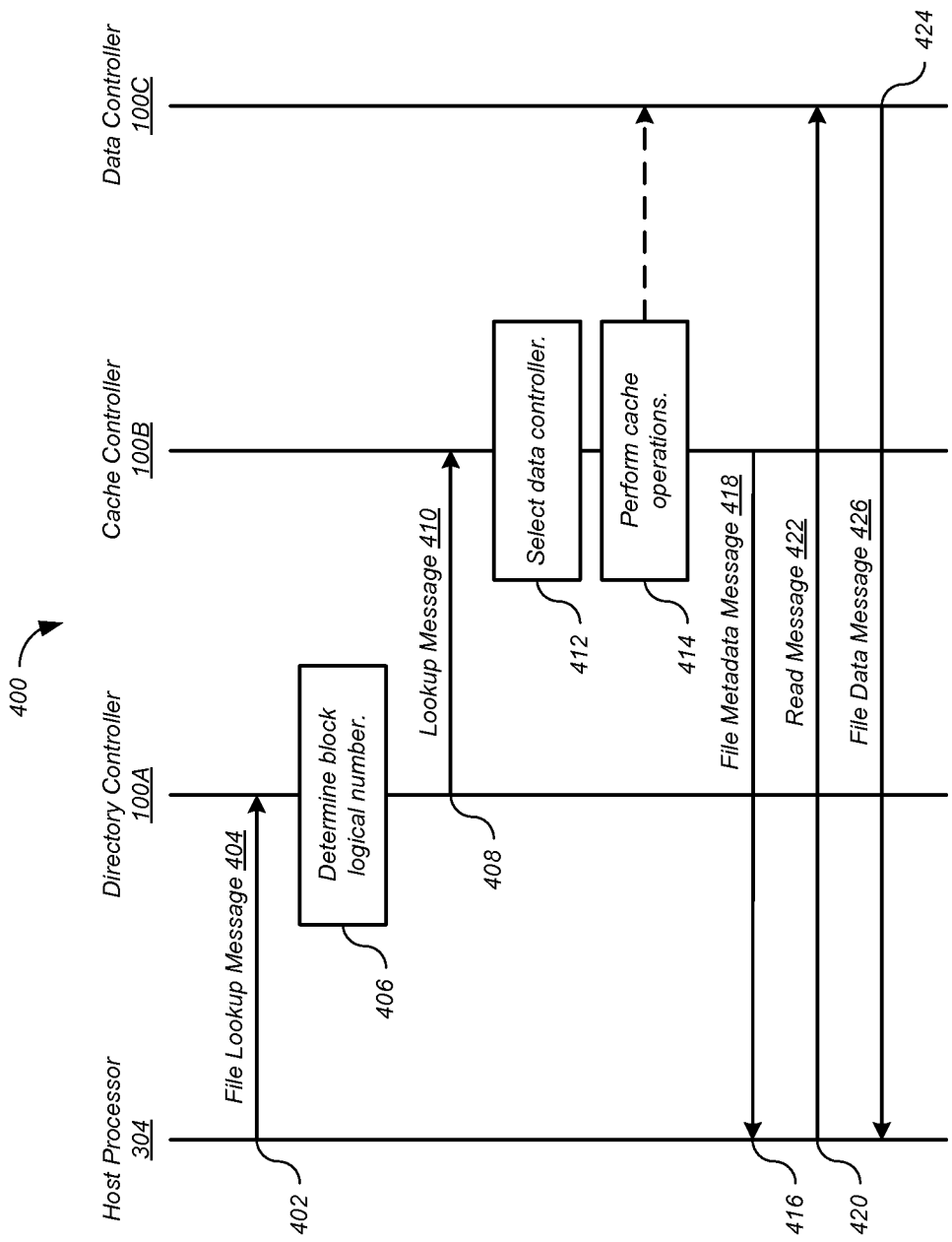
FIG. 4 shows a read process for the flash memory file system of FIG. 3 according to one embodiment.
Figure 5:
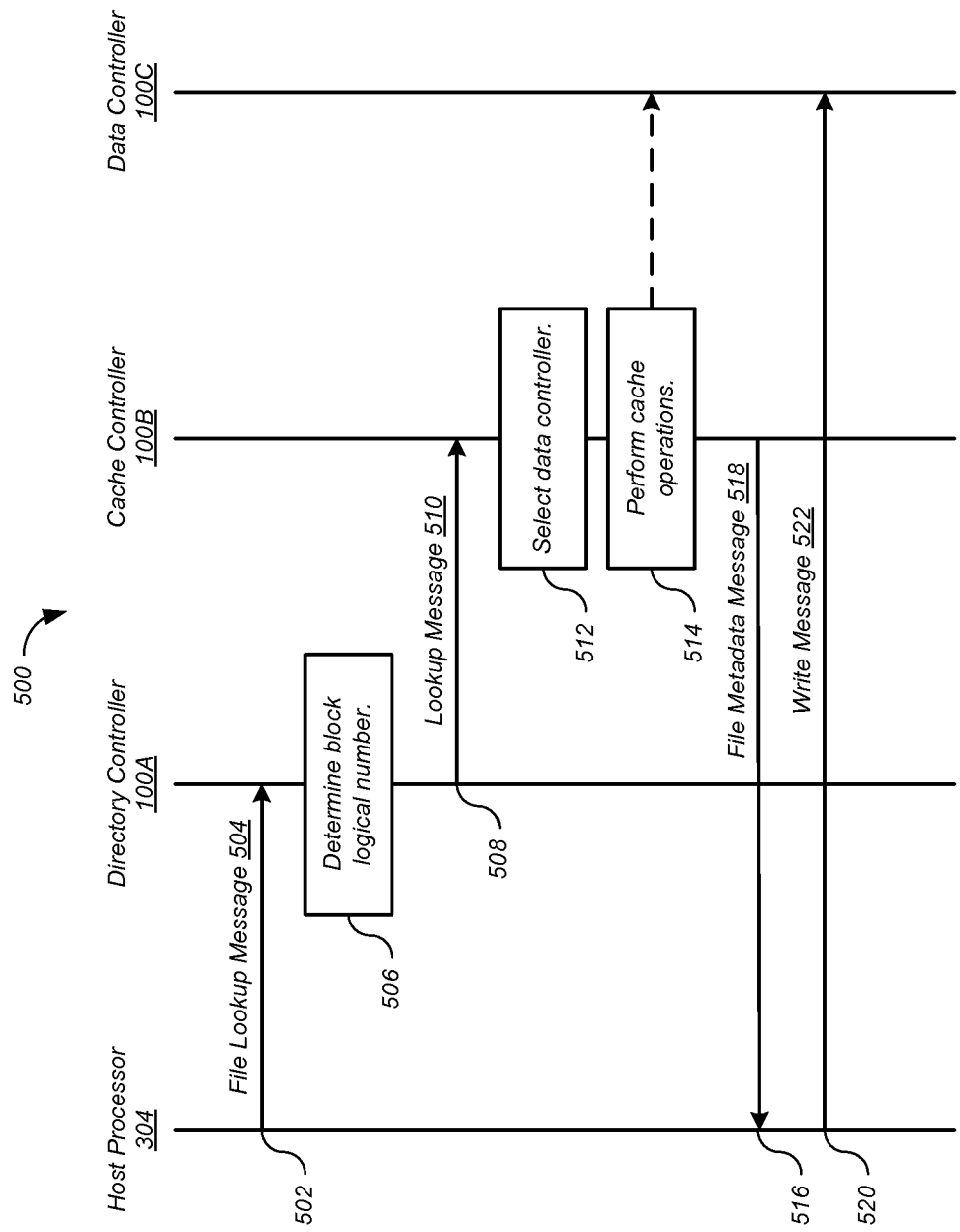
FIG. 5 shows a write process for the flash memory file system of FIG. 3 according to one embodiment.

FIG. 4 shows a read process 400 for the flash memory file system of FIG. 3 according to one embodiment. FIG. 5 shows a write process 500 for the flash memory file system of FIG. 3 according to one embodiment. Although in the described embodiments the elements of processes 400 and 500 are presented in one arrangement, other embodiments may feature other arrangements. For example, in various embodiments, some or all of the steps of processes 400 and 500 can be executed in a different order, concurrently, and the like.

FIGS. 4 and 5 show the interactions between host processor 304 and three flash modules 100A, 100B, and 100C. In the example of FIG. 4, flash module 100A is configured as a directory controller, flash module 100B is configured as a cache controller, and the remaining flash modules are implemented as data controllers. Flash module 100C is selected from the data controllers as part of process 400. For clarity, in FIGS. 4 and 5 flash modules 100 are referred to as directory controller 100A, cache controller 100B, and data controller 100C. The software for host processor 304 maintains a mapping table between each flash controller and its function. The mapping table is established during the bootup process, when each flash controller 100 reports its function to host processor 304. An example of a mapping table is shown as Table 1 below.

TABLE 1

| | |
|---|---|
| Flash Controller 100A | Directory Controller |
| Flash Controller 100B | Cache Controller |
| Flash Controller 100C | Data Controller |
| Flash Controller 100D | Data Controller |
| — | — |
| — | — |
| Flash Controller 100N | Data Controller |

Referring to FIG. 4, at 402 host processor 304 sends a file lookup message 404 to directory controller 100A. As used herein, the term "message" generally refers to an electronic signal representing a digital message. File lookup message 404 includes a path name for file data to be read from the flash file system. The path name can be a string that identifies the file data. At 406, directory controller 100A determines a block logical number based on the path name. The block logical numbers are used to identify flash memory blocks.

At 408, directory controller 100A sends a lookup message 410 to cache controller 100B. Lookup message 410 includes the block logical number. In response, at 412 cache controller 100B selects one of data controllers 100C-100N based on the block logical number. In this example, cache controller 100B selects data controller 100C.

Recall that each flash module 100 includes a cache memory 108, and that cache controller 100B operates a portion of each of cache memory 108 collectively as a global cache, and operates another portion of each cache memory 108 as a local cache. To operate the global cache, cache controller 100B maintains a map of the global cache blocks in each cache memory 108, and employs an algorithm such as the least recently used (LRU) algorithm to select and replace cache blocks. Cache requests are queued and served on a first-come-first-served basis. In some embodiments, a control algorithm is implemented to dynamically adjust the local or shared memory size for each flash module 100. For example, if a local memory block is not used for a certain amount of time, it can be dynamically added to the global cache to be used as a remote cache for other flash modules 100.

At 414, cache controller 100B performs cache operations, if needed, for example when the data in cache memory 108 is dirty. In particular, cache controller 100B determines whether cache memory 108 of selected data controller 100C contains data corresponding to the block logical number in lookup message 410. If not, cache controller 100B moves data from one of the flash memories 104 of selected data controller 100C to cache memory 108 of selected data controller 100C.

At 416, cache controller 100B sends a file metadata message 418, responsive to file lookup message 404, to host processor 304. File metadata message 418 identifies data controller 100C as containing the file data requested in the file lookup message 404. File metadata message 418 also includes the block logical number of the file data.

At 420, host processor 304 sends a read message 422 to the data controller 100 identified in file metadata message 418, in this example, data controller 100C. Read message 422 includes the block logical number identified in file metadata message 418. In response, at 424 data controller 100C sends a file data message 426 to host processor 304. File data message 426 includes the requested file data retrieved from cache memory 108. At this point read process 400 is complete.

Now write process 500 of FIG. 5 is described. Referring to FIG. 5, at 502 host processor 304 sends a file lookup message 504 to directory controller 100A. File lookup message 504 includes a path name for file data to be written to the flash file system. At 506, directory controller 100A determines a block logical number based on the path name.

At 508, directory controller 100A sends a lookup message 510 to cache controller 100B. Lookup message 510 includes the block logical number. In response, at 512 cache controller 100B selects one of data controllers 100C-100N based on the block logical number. In this example, cache controller 100B selects data controller 100C.

At 514, cache controller 100B performs cache operations, if needed, for example to make space available in cache memory 108 for the write operation. In particular, cache controller 100B determines whether cache memory 108 of selected data controller 100C contains data corresponding to the block logical number in lookup message 510. If not, cache controller 100B moves data from cache memory 108 of selected data controller 100C to one of the flash memories 104 of selected data controller 100C.

At 516, cache controller 100B sends a file metadata message 518, responsive to file lookup message 504, to host processor 304. File metadata message 518 identifies data controller 100C as the destination for the file data corresponding to file lookup message 504. File metadata message 518 also includes the block logical number for the file data.

At 520, host processor 304 sends a write message 522 to the data controller 100 identified in file metadata message 518, in this example, data controller 100C. Write message 522 includes the block logical number identified in file metadata message 518, as well as the file data to be written to the flash file system. In response, at 524 data controller 100C stores the file data in cache memory 108 of data controller 100C according to the block logical number. At this point write process 500 is complete.

Various embodiments can be implemented in digital electronic circuitry, or in computer hardware, firmware, software, or in combinations of them. Embodiments can be implemented in a computer program product tangibly embodied in a machine-readable storage device for execution by a programmable processor; and method steps can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. A flash memory file system, comprising:
   a plurality of flash modules, wherein each of the plurality of flash modules includes (i) a respective cache memory, (ii) a respective flash memory, and (iii) a respective flash controller in communication with the respective cache memory and the respective flash memory;
   a first flash module of the plurality of flash modules, wherein the first flash module is configured to receive a file lookup message, the file lookup message including a path name for file data stored on a second flash module of the plurality of flash modules; and
   a third flash module of the plurality of flash modules, wherein the third flash module is configured to
      select the second flash module based on (i) the path name and (ii) a directory table, and
      generate a file metadata message, responsive to the file lookup message, wherein the file metadata message identifies the second flash module as containing the file data.

2. The flash memory file system of claim 1, wherein the flash controller of the first flash module is configured to operate the cache memories of the plurality of flash modules together as a global cache, and wherein the global cache is usable, as cache memory, by each of the plurality of flash modules.

3. The flash memory file system of claim 1, wherein the flash controller of the third flash module is configured to operate the third flash module as a directory controller for each of the flash memories of the plurality of flash modules.

4. The flash memory file system of claim 1, wherein the flash controller of the third flash module is configured to (i) operate a first portion of each of the respective cache memories as a local cache and (ii) operate a second portion of each of the respective cache memories as a part of a global cache usable by each of the plurality of flash modules.

5. The flash memory file system of claim 1, further comprising:
a plurality of flash controller cards, wherein each of the flash controller cards comprises a respective one of the flash modules.

6. The flash memory file system of claim 1, wherein the first flash module is configured to (i) determine a block logical number based on the path name and (ii) send a lookup message to the third flash module, wherein the lookup message includes the block logical number.

7. The flash memory file system of claim 6, wherein, to select the second flash module, the third flash module is configured to select the second flash module based on the block logical number as received in the lookup message.

8. The flash memory file system of claim 6, wherein the second flash module is configured to (i) receive, in response to the file metadata message, a read message including the block logical number and (ii) in response to the read message, send a file data message containing the file data corresponding to the block logical number.

9. A method of operating a flash memory file system, the method comprising:
receiving a file lookup message at a first flash module of a plurality of flash modules, wherein each of the flash modules includes (i) a cache memory, (ii) a flash memory, and (iii) a respective flash controller in communication with the cache memory and the flash memory, and wherein the file lookup message includes a path name for file data stored on a second flash module of the plurality of flash modules;
selecting, at a third flash module of the plurality of flash modules, the second flash module based on (i) the path name and (ii) a directory table; and
sending, from the third flash module, a file metadata message responsive to the file lookup message, wherein the file metadata message identifies the second flash module as containing the file data.

10. The method of claim 9, further comprising, using the flash controller of the first flash module, operating the cache memories of the plurality of flash modules together as a global cache, wherein the global cache is usable, as cache memory, by each of the plurality of flash modules.

11. The method of claim 9, further comprising, using the flash controller of the third flash module, operating the third flash module as a directory controller for each of the flash memories of the plurality of flash modules.

12. The method of claim 9, further comprising, using the flash controller of the third flash module, (i) operating a first portion of each of the respective cache memories as a local cache and (ii) operating a second portion of each of the respective cache memories as a part of a global cache usable by each of the plurality of flash modules.

13. The method of claim 9, further comprising, using the first flash module, (i) determining a block logical number based on the path name and (ii) sending a lookup message to the third flash module, wherein the lookup message includes the block logical number.

14. The method of claim 13, wherein selecting the second flash module includes, using the third flash module, selecting the second flash module based on the block logical number as received in the lookup message.

15. The method of claim 14, wherein the second flash module is configured to (i) receive, in response to the file metadata message, a read message including the block logical number and (ii) in response to the read message, send a file data message containing the file data corresponding to the block logical number.

16. The method of claim 13, further comprising moving data from the flash memory of the second flash module to the respective cache memory of the second flash module in response to a determination that the respective cache memory of the second flash module does not contain data corresponding to the block logical number.

17. The method of claim 13, further comprising:
receiving a write message at the second flash module, wherein the write message includes the file data and the block logical number; and
storing the file data in the second flash module according to the block logical number.

18. The method of claim 13, further comprising:
determining whether the respective cache memory of the second flash module contains data corresponding to the block logical number;
in response to the respective cache memory of the second flash module not containing the data corresponding to the block logical number, moving data from the respective cache memory of the second flash module to the respective flash memory of the second flash module; and
storing the file data in the respective cache memory of the second flash module subsequent to moving the data.

* * * * *